United States Patent
Cline et al.

(10) Patent No.: US 9,170,626 B2
(45) Date of Patent: *Oct. 27, 2015

(54) PERFORMANCE REDUCTION LIMIT FOR POWER CONSUMPTION DEVICE

(75) Inventors: Leslie E. Cline, Sunnyvale, CA (US); Sitaram Yadavalli, San Jose, CA (US); Ishmael Santos, Milpitas, CA (US); Jim Hermerding, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,355

(22) Filed: Feb. 8, 2011

(65) Prior Publication Data

US 2011/0127834 A1 Jun. 2, 2011

Related U.S. Application Data

(63) Continuation of application No. 12/164,228, filed on Jun. 30, 2008, now Pat. No. 7,884,499.

(51) Int. Cl.
- *H02J 3/12* (2006.01)
- *G06F 1/32* (2006.01)
- *G06F 1/20* (2006.01)

(52) U.S. Cl.
CPC .............. *G06F 1/3203* (2013.01); *G06F 1/206* (2013.01); *Y02B 60/1275* (2013.01); *Y10T 307/438* (2015.04)

(58) Field of Classification Search
USPC .......................................................... 307/35
See application file for complete search history.

(56) References Cited

U.S. PATENT DOCUMENTS

| | | | |
|---|---|---|---|
| 5,583,419 A | 12/1996 | Haller | |
| 5,751,565 A * | 5/1998 | Faulk | 363/41 |
| 6,633,802 B2 | 10/2003 | Sodoski et al. | |
| 7,337,339 B1 | 2/2008 | Choquette et al. | |
| 7,363,517 B2 | 4/2008 | Bodas | |
| 2004/0201279 A1 | 10/2004 | Templeton | |
| 2009/0152942 A1 | 6/2009 | Waite et al. | |

FOREIGN PATENT DOCUMENTS

| | | |
|---|---|---|
| TW | 512261 B | 12/2002 |
| TW | 200634497 | 10/2006 |

OTHER PUBLICATIONS

Office action for German Application No. 102009030697.8, mailed Jan. 11, 2012.

Office Action mailed Apr. 1, 2013 for Taiwan Application No. 9812614, 13 pages.

* cited by examiner

*Primary Examiner* — Rexford Barnie
*Assistant Examiner* — Dru Parries
(74) *Attorney, Agent, or Firm* — John F. Travis

(57) ABSTRACT

For one disclosed embodiment, a lower limit for a power consumption device may be identified. Performance of the power consumption device may be reduced in response to a determination that a temperature corresponding to the power consumption device exceeds a threshold. Performance reduction may be limited based on the lower limit. Other embodiments are also disclosed.

16 Claims, 4 Drawing Sheets

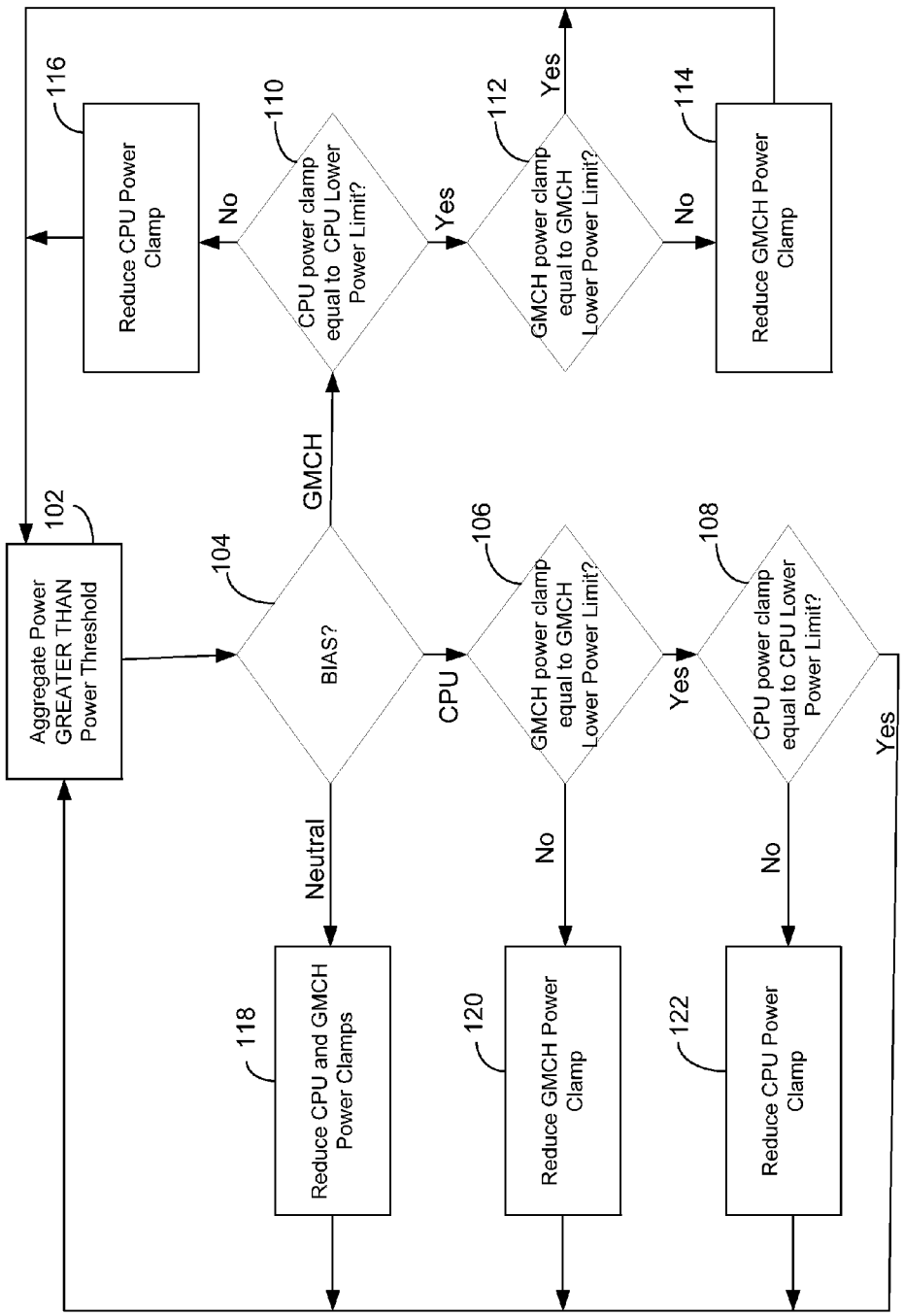

PERFORMANCE REDUCTION LIMIT FOR POWER CONSUMPTION DEVICE

RELATED APPLICATIONS

The present application is a continuation application of U.S. patent application Ser. No. 12/164,228, filed Jun. 30, 2008, now issued as U.S. Pat. No. 7,884,499, the disclosure of which is hereby incorporated by reference in its entirety for all purposes except for those sections, if any, that are inconsistent with this specification.

TECHNICAL FIELD

Embodiments of the disclosure relate generally to power and thermal management of electronic components and, more specifically, to power and thermal management of self-regulating electronic components.

BACKGROUND INFORMATION

Computing devices such as desktop and laptop computers, palm-sized computing devices, set-top box, media players (e.g., a CD or DVD player), and so forth, typically employ a number of electronic components that generate thermal energy in the form of heat. These components include, for example, processors and controllers that may consume varying amounts of power and thereby generate varying amounts of heat when in operation. Because excessive heat can reduce the overall performance and can cause damage to the components as well as cause damage to other components, designers and manufacturers of such computing devices spend a considerable amount of time developing ways to prevent such devices from overheating. As a result, larger computing devices such as desktop computers will typically employ some sort of cooling system that will employ, among other things, fans in order to counteract the large amount of thermal energy generated by various components.

Unfortunately, as computing devices such as laptops become more compact and condensed, and as individual components such as processors become increasingly more powerful and thus, consuming more power and generating more heat, it is becoming more difficult to manage the tremendous amounts of thermal energy being generated by such components. Increasingly, component designers incorporate self-regulation circuitry with the components to self-regulate their performance or the amount of heat produced by the various components. However, the self-regulation may be sub-optimal.

BRIEF DESCRIPTION OF THE DRAWINGS

Embodiments of the disclosure will be described referencing the accompanying drawings, in which like references denote similar elements, and in which:

FIG. 4 is another process for managing power of the multiple self-regulating power consumption devices of FIG. 2, in accordance with various embodiments.

DETAILED DESCRIPTION OF ILLUSTRATIVE EMBODIMENTS

Figure 1:
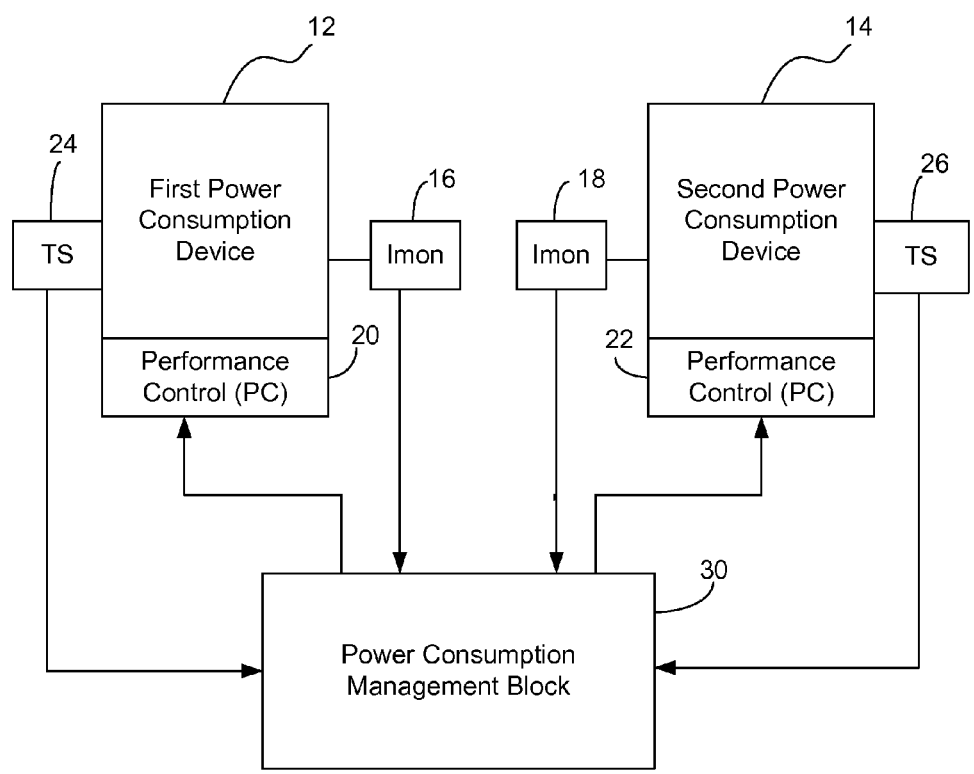
FIG. 1 illustrates an overview of various embodiments.

Illustrative embodiments include but are not limited to methods for executing tasks in response to wake events in computing devices while the devices are in a reduced power consumption state, components contributing to the practice of these methods, in part or in whole, and devices endowed with such components.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

One recent trend with respect to computing devices is to include components that have self-regulating features, which allow the components to self-regulate their performance, including heat generation. For example, many computing devices such as desktops and laptops employ a number of processors and/or controllers. In some computing devices, some of these components may have a self-regulating feature, which for purposes of this description will be referred to as "performance controller" or "performance control" (PC) that allows the components to self-increase or -decrease their operational performances depending upon, for example, the specific application or applications that they are to execute, and in turn, their power dissipation and consequent heat generation. For instance, when such computing devices are running an application or an overall workload that requires increased computational operations, the processors and/or controllers having the PCs may independently increase their operational performances. Typically, the "performance" of an electronic component such as, for example, a processor, may be increased by increasing the clock speed, the electrical current, and the voltage being supplied to such components. By increasing the voltage and the current, these components, in addition to increased performance and power consumption, will likewise increase their thermal outputs in the form of, for example, higher heat or thermal dissipation.

That is, the thermal condition of, for example, a processor may be directly linked to the processor performance and power consumption. As power consumption (as well as power dissipation) is raised, processor performance and heat dissipation of the processor, all of which are closely linked together, will also increase. Similarly, if the power consumption is reduced or clamped, processor performance and heat dissipation of the processor may also be reduced. Because of the close link between "performance," "power consumption," and "power dissipation," these terms may be used interchangeably in the following description.

Because PCs will allow their associated components (e.g., processors and controllers) to operate at higher level of performance, increased amounts of power will be dissipated and increased amounts of heat will also be generated. This increase in power/heat generation may be particularly undesirable in light of current trends to place multiple components on a single integrated circuit package. For example, a package having multiple processors and/or controllers having self-regulating features (e.g., PCs) that are operating at maximum performance levels may dissipate large amounts of power that may surpass the overall power budget of the package, or generate large amounts of heat that may surpass the overall thermal budget of the package. As a result, the heat generated may overwhelm system-level cooling capabilities. Prolonged generation of such heat will in the long run damage the components as well as other nearby components.

According to various embodiments, methods and apparatuses are provided that may intervene in the self-thermal or self-power regulations of a plurality of independent power/heat dissipation devices. In some embodiments, the novel apparatuses and methods may be employed with respect to multiple packages to stay within a system-level cooling capability. For the embodiments, the methods may include monitoring power consumption and thermal conditions of a plurality of thermal production (i.e., power consumption) devices that are configured to independently self-regulate their performance and consequent power consumption and heat dissipation. A determination may then be made as to whether an aggregate of the power consumption or thermal production of the plurality of thermal production devices exceeds a threshold. And if the aggregate of the power consumption or thermal production of the thermal production devices was determined to exceed the threshold, terminating, at least partially, the independent self-regulating of the power consumption and intervening in the power regulation of one or more of the thermal production devices by, for example, reducing the power consumption or consumptions (i.e., thermal production or productions) of one or more of the thermal production devices. In contrast, if the aggregate of the power consumption of the plurality of thermal production devices falls below the threshold then the thermal production devices may be allowed to self-regulate their power consumptions, and in some instances, one or more of the individual power limits for the thermal production devices, which will be referred to herein as "power clamps," may even be relaxed or raised. These and other aspects of various embodiments will be described herein. Although the embodiments to be described herein are directed to systems having two heat dissipation devices (herein "power consumption devices"), alternative embodiments may be directed to systems having three or more power consumption devices.

FIG. 1 illustrates a system that includes multiple self-regulating power consumption (i.e., thermal production) devices and a power consumption management block in accordance with various embodiments. In some embodiments, the system 10 may be part of a computing device such as a laptop, a desktop, a set-top box, and so forth. As depicted, the system 10 may include a first power consumption device 12, a second power consumption device 14, current monitors (Imon) 16 and 18, performance controls (PC) 20 and 22, temperature sensors (TS) 24 and 26, and a power consumption management block 30, which is physically and thermally coupled to the first and second power consumption devices 12 and 14 (which may also be referred to as thermal production devices). The power consumption devices 12 and 14, in various embodiments, may be any type of power-consuming and power-dissipating (i.e., heat dissipating) components such as processors, controllers, and/or other types of electronic components that may be employed in, for example, a computing device. In some embodiments, at least the power consumption devices 12 and 14 may be disposed on a common chassis such as a single integrated circuit package, or several integrated circuit packages mounted on one or more printed circuit boards. Note that in the following description, the first and second power consumption devices 12 and 14 may also be referred to as "thermal production" devices.

Each of the power consumption devices 12 and 14 may have corresponding performance controls (PCs) 20 and 22 that allow the power consumption devices 12 and 14 to self-regulate their performances (i.e., to self-regulate their power and heat dissipations). The PCs 20 and 22 may control their respective power consumption devices 12 and 14 such that the power consumption devices 12 and 14 will operate within a predefined power range. A power range may be provided by defining a lower (i.e., minimum) and an upper (i.e., maximum) power limit that a power consumption device 12 or 14 is allowed to operate in. In order to operate within the respective operating ranges of the power consumption devices 12 and 14, each of the PCs 20 and 22 may provide a power clamp for their respective power consumption device 12 or 14. A power clamp basically limits or clamps the power consumption or power dissipation (i.e., heat dissipation) of the corresponding power consumption device 12 or 14 based on, for example, a predefined static allocation of power consumption between the power consumption devices 12 and 14. The power consumption level or heat dissipation level, as defined by the power clamp, will fall within the power range (i.e., between an upper and a lower power limit). Thus, a power clamp defines the maximum power consumption/heat dissipation level allowed for a power consumption device 12 or 14 at any given moment in time.

Note that typically the upper power limit for a power consumption device that is using only self-regulation may be substantially smaller than the upper power limit for a power consumption device that is being assisted/controlled by a power consumption management block 30. For example, suppose the first power dissipation device 12 is a device with a self-regulated upper limit of 25 Watts and suppose further that the second power dissipation device 14 is a device with a self-regulated upper limit of 12 Watts that fits in a 37 Watt System Cooling Capability. In this example, the power consumption management block 30 may primarily monitor the 37 Watt total. Thus, if the second power dissipation device 14 is only taking 7 Watts, then the power consumption management block 30 may raise the upper limit of the first power dissipation device 12 to 30 Watts (well above the first power dissipation device 12 "normal" 25 Watt upper limit). So, the power consumption management block 30 may not only control the power clamps within the "normal" limits, it may also control the power clamps with an "expanded" set of limits. Note that this is true only for "power," the "temperature" may not be shared/relaxed in this fashion.

Components of computing devices will often have individual power or thermal budgets that they need to abide by. This is particularly true for, for example, mobile devices such as laptop computers that have a number of constraints that make them susceptible to overheating. In addition to individual power or thermal budgets, there may also be an overall power budget for multiple components. For example, when multiple power consumption devices are placed on a common integrated circuit package, there may be an overall power budget for all of the power consumption devices on the integrated circuit package. The overall budget for the power consumption devices may, however, be exceeded when the power consumption devices have self-regulating performance controls (e.g., PCs 20 and 22). For example, if the first power consumption device 12 is operating at its upper power limit (i.e., the power clamp as provided by the PC 20 is equal to the upper power limit of the first power consumption device 12) and the second power consumption device 14 is also operating at its upper power limit (i.e., the power clamp as provided by the PC 22 is equal to the upper power limit of the second power consumption device 14), the combined or aggregated power consumption of both of the power consumption devices 12 and 14 may exceed the overall power budget allocated to the two power consumption devices 12 and 14. Note that the power consumption management block 30, in this case, may not only control the power clamps within the "normal" limits, it may also control power clamps within an "expanded" set of limits. Again, this may be true only for "power" limits and is not directed to sharing or relaxing of temperatures limits.

The power consumption management block 30, which may be embodied in hardware, software, firmware, or a combination thereof, may be used in order to manage power dissipation from the power consumption devices 12 and 14 such that the overall power budget, which will be referred to herein as a "power threshold" or "aggregate power threshold" for the power consumption devices 12 and 14 is not substantially violated. For example, in some embodiments, the power consumption management block 30 may monitor the individual power consumption conditions of the power consumption devices 12 and 14, and based on the individual monitoring, may or may not instruct one or both of the PCs 20 and 22 to incrementally readjust their respective power clamps whenever, for example, the total power consumed or dissipated by the power consumption devices 12 and 14 exceeds the power threshold (i.e., overall power budget for the power consumption devices 12 and 14). Readjustment of the power clamps may be via lowering or reducing of one or both of the power clamps for the power consumption devices 12 and 14. As a result, one or both of the power consumption devices 12 and 14 may operate at lower power levels, resulting in lower power dissipations and lower heat dissipations. This procedure of monitoring and readjustment of the power clamps may be repeated over and over again until each of the power consumption devices 12 and 14 have the appropriate power consumption conditions to meet the aggregate power threshold for the power consumption devices 12 and 14.

One or more metrics may be monitored in order to determine the thermal conditions of the of the first and second power consumption devices 12 and 14. For example, in some embodiments in addition to monitoring power consumption/dissipation of the power consumption devices 12 and 14, temperatures of the power consumption devices 12 and 14 may be continually or periodically determined in order to determine the thermal conditions of a power consumption device 12 or 14. The power consumption/dissipation (or simply "power") of a power consumption device 12 or 14, such as a processor, may be monitored by determining the amount of electric current flowing through the power consumption device 12 or 14. Since power is merely a function of current and voltage, and since the voltage being supplied to the power consumption device 12 or 14 is usually known, by simply measuring the electrical current flowing into the power consumption device 12 or 14, a determination may be made as to the power dissipation of the power consumption device 12 or 14. Alternatively, the "power" of a power consumption device may be determined or estimated by activity monitoring capabilities included in the design of the power consumption device.

Once the power dissipation of each of the first and the second power consumption devices 12 and 14 is determined using, for example, the current monitors 16 and 18, the aggregate or combined power consumption for the first and second power consumption devices 12 and 14 may be calculated by the power consumption management block 30 by simply adding together the individual power consumptions of the first and second power consumption devices 12 and 14. The aggregate power consumption may then be compared to a power threshold (i.e., the overall power budget for the power consumption devices 12 and 14) in order to determine whether one or both of the power clamps for the power consumption devices 12 and 14 need to be adjusted in order to adjust the power being consumed/dissipated by one or both of the power consumption devices 12 and 14. Thus, if the power threshold has been exceeded, one or both of the power clamps for the power consumption devices 12 and 14 may be, at least, incrementally reduced by the power consumption management block 30 by instructing one or both of the PCs 20 and 22 to reduce their power clamps. The decision as to which of the power clamps to be adjusted will be described in greater detail below. In the case where the aggregate power consumption of the power consumption devices 12 and 14 is below the power threshold, the power consumption devices 12 and 14 may be allowed to self-regulate themselves, and in some instances, the power consumption management block 30 may even intervene to raise the power clamps for one or both of the power consumption devices 12 and 14.

In various embodiments, the power consumption management block 30 may, in addition to monitoring the power consumption/dissipations of the power consumption devices 12 and 14, monitor the temperatures of the first and second power consumption devices 12 and 14 using the temperature sensors 24 and 26. If the power consumption management block 30 determines that the temperatures of one or both of the power consumption devices 12 and 14 has exceeded certain temperature thresholds, then the power consumption management block 30 may instruct one or both of the PCs 20 and 22 to reduce their power clamps even though the aggregate power dissipations of the power consumption devices 12 and 14 did not exceed the power threshold. This may ensure that neither of the power consumption devices 12 and 14 will overheat.

Figure 2:
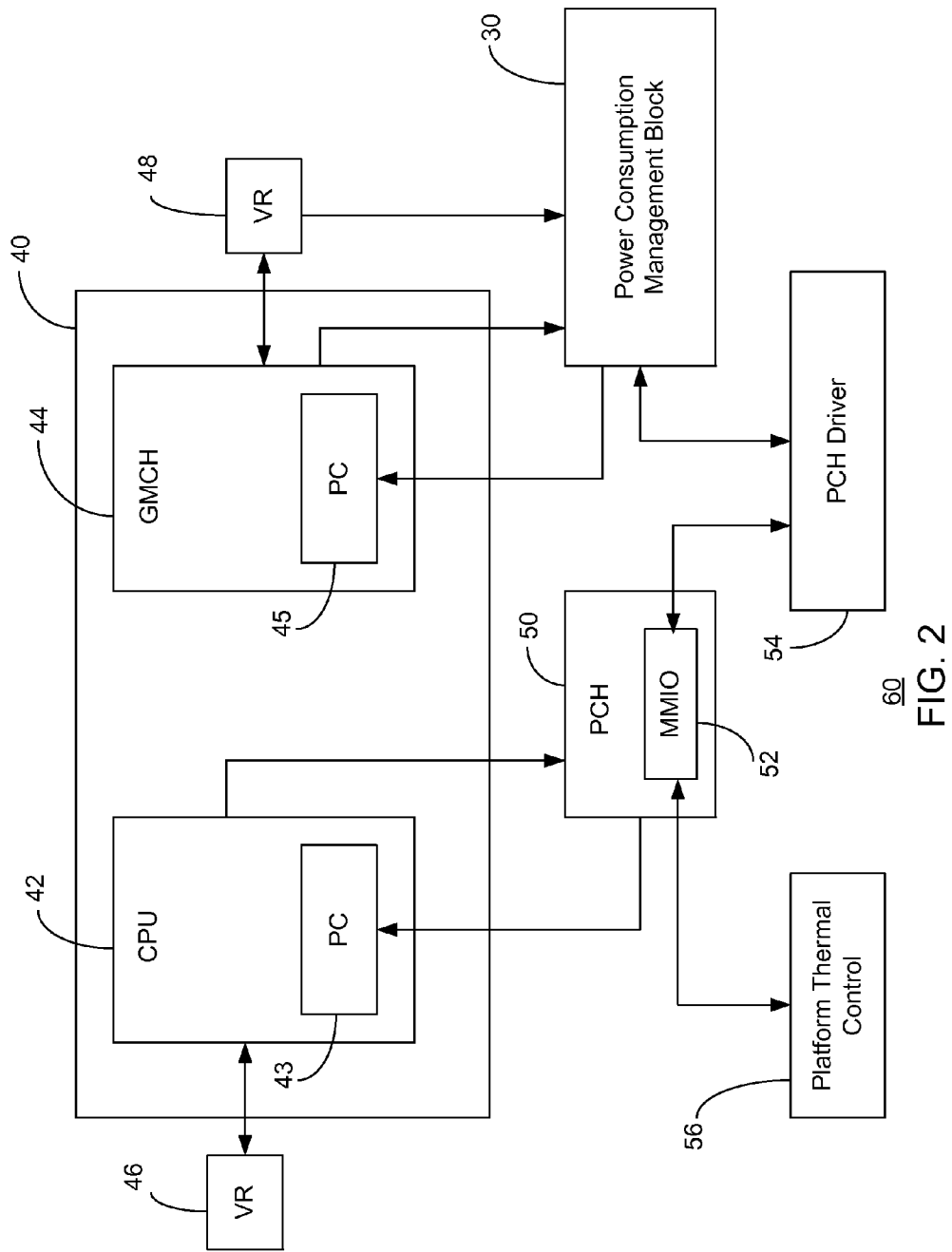
FIG. 2 illustrates a particular implementation of the embodiments illustrated in FIG. 1.

FIG. 2 illustrates a particular implementation of the system 10 of FIG. 1, in accordance with various embodiments. As in system 10 of FIG. 1, system 60 includes a power consumption management block 30 to manage heat dissipations of multiple heat dissipating devices, which, in this case, are a central processing unit (CPU) 42 and a Graphics and Memory Controller Hub (GMCH) 44 that are disposed on a integrated circuit package 40. The CPU 42 and the GMCH 44 may each have a corresponding performance control (PC) 43 and 45 to facilitate the CPU 42 and the GMCH 44 in self-regulating their own operational performances (as well as their power consumption/dissipation). In particular, each of the PCs 43 and 45 may provide a power clamp that that may be within the power operating range of the corresponding device (i.e., CPU 42 and GMCH 44), the power clamp being initially set, in some embodiments, by statistical determinations. With respect to PC 43, PC 43 may be, in some embodiments, hardwired into the CPU 42, while PC 45 may be partially embedded in both the GMCH 44 and a graphics driver (not depicted).

The power consumption management block 30 may monitor the power conditions of the CPU 42 as well as to control, when prompted to do so based on the monitoring of the power/thermal conditions of the CPU 42, the performance (i.e., power consumption/power or heat dissipation) of the CPU 42 indirectly via a platform controller hub (PCH) 50, which includes a memory-map input/output (MMIO) register set 52, and PCH driver 54. In contrast, the power consumption management block 30 may monitor the power/thermal conditions of the GMCH 44 and control, when prompted to do so based on the monitoring of the power/thermal consumption conditions of the GMCH 44, the power consumption of the GMCH 44 directly. In some embodiments, the power consumption management block 30 may be viewed as a power/thermal controller that is configured to permit the self-regulation of the CPU 42 and the GMCH 44 to continue as long as the self-regulation does not trigger a package level power dissipation event or a package level thermal management event.

The CPU 42 and the GMCH 44 may both have a voltage regulator (VR) 46 and 48 that may have current monitoring capabilities. Thus, the power consumption management block 30 may use the current monitoring features of the VRs 46 and 48 in order to determine the electrical currents flowing through the CPU 42 and the GMCH 44 in order to calculate the power consumption/dissipations of the CPU 42 and the GMCH 44. Alternatively, or in addition to the VR monitoring, other methods of power consumption measurement, or estimations of power consumption may be employed that may be based on internal monitoring of the internal activities of the CPU 42 and the GMCH 44. In any event, the power consumptions of the CPU 42 and the GMCH 44 determined by the power consumption management block 30 may then be aggregated by the power consumption management block 30, and the aggregate power consumption ("aggregate power") may then be compared to an aggregate power threshold (i.e., the maximum combined power allowed) for the CPU 42 and the GMCH 44. If the aggregate power is determined to be greater than the aggregate power threshold, then the power consumption management block 30 may instruct one or both of the PCs 43 and 45 to adjust (e.g., incrementally reduce) their power clamps in order to reduce the overall power dissipation of the CPU 42 and the GMCH 44. In contrast, if the aggregate power is determined be less than the aggregate power threshold, than the CPU 42 and the GMCH 44 may be allowed to self-regulate, and the power consumption management block 30 may even, in some instances, instruct one or both of the PCs 43 and 45 to adjust their power clamps by raising the power clamps.

In some embodiments, a user may provide a performance preference or bias towards one of the power consumption devices (i.e., CPU 42 and GMCH 44) that may decide which of the power clamps associated with the power consumption devices is to be adjusted once the aggregate power of the CPU 42 and the GMCH 44 has been determined to be greater than the aggregate power threshold. For example, in the case of the system 60 of FIG. 2, the user may have three choices, to bias towards CPU 42, to bias towards GMCH 44, or to be neutral. Suppose the user elects to bias towards, for example, the CPU 42. When the combined or aggregate power of the CPU 42 and the GMCH 44 is determined to be greater than the aggregate power threshold, then the power clamp for the GMCH 44 may be adjusted downwards first before the power clamp for the CPU 42 is adjusted downwards, so long as the power clamp for the GMCH 44 is not equal to or less than the lower power limit of the GMCH 44.

Similarly, if the user selects to bias towards the GMCH 44, the power clamp for the CPU 42 may be adjusted downward first before the power clamp for the GMCH 44 is adjusted downward when the combined or aggregate power of the CPU 42 and the GMCH 44 is determined to be greater than the aggregate power threshold. If the user elects a neutral position, then whenever the aggregate power of the CPU 42 and the GMCH 44 is determined to be greater than the aggregate power threshold, then both of the power clamps for CPU 42 and the GMCH 44 may be adjusted downwards equally, proportionally, or in any other manner.

Performance preference may also be provided for situations when the aggregate power of the CPU 42 and the GMCH 44 has been determined to be less than the aggregate power threshold. For example, in this case where the aggregate power is less than the power threshold, if the user elects to bias towards, for example, the CPU 42, the power clamp for the CPU 42 may be adjusted upwards before the power clamp for the GMCH 44 is adjusted upwards. Similarly, if the user elects to bias towards the GMCH 44 instead of the CPU 42, the power clamp for the GMCH 44 may be adjusted upwards first before the power clamp for the CPU 42 is adjusted upwards. If the user elects a neutral position, then the power clamps for both the CPU 42 and the GMCH 44 may be adjusted upwards equally, proportionally, or in any other manner.

In some embodiments, the power consumption management block 30 may monitor the temperatures of the CPU 42 and the GMCH 44 to supplement the power consumption monitoring of the CPU 42 and the GMCH 44 described above to ensure that the CPU 42, the GMCH 44, and/or the integrated circuit package 40 is not overheating. For example, even if it is determined that the aggregated power of the CPU 42 and the GMCH 44 is determined to be less than the aggregated power threshold, the power consumption management block 30 may, nevertheless, instruct one or both of the PCs 43 and 45 to adjust downwards their respective power clamps if it is determined that the temperatures of one or both of the CPU 42 and the GMCH 44 is determined to be greater than selective temperature thresholds.

The power consumption management block 30, may operate under the at least partial direction of the platform thermal control 56. The platform thermal control 56 may monitor the overall thermal conditions of various components of a computing device including the CPU 42 and the GMCH 44 and those components not depicted in FIG. 2. The platform thermal control 56 may also provide the user bias preferences previously described to the power consumption management block 30. The platform thermal control 56 may also directly or indirectly control or participate in the determination of the aggregate power threshold, the temperature limits, and other parameters that control or influence the actions of the power consumption management block 30.

Figure 3:
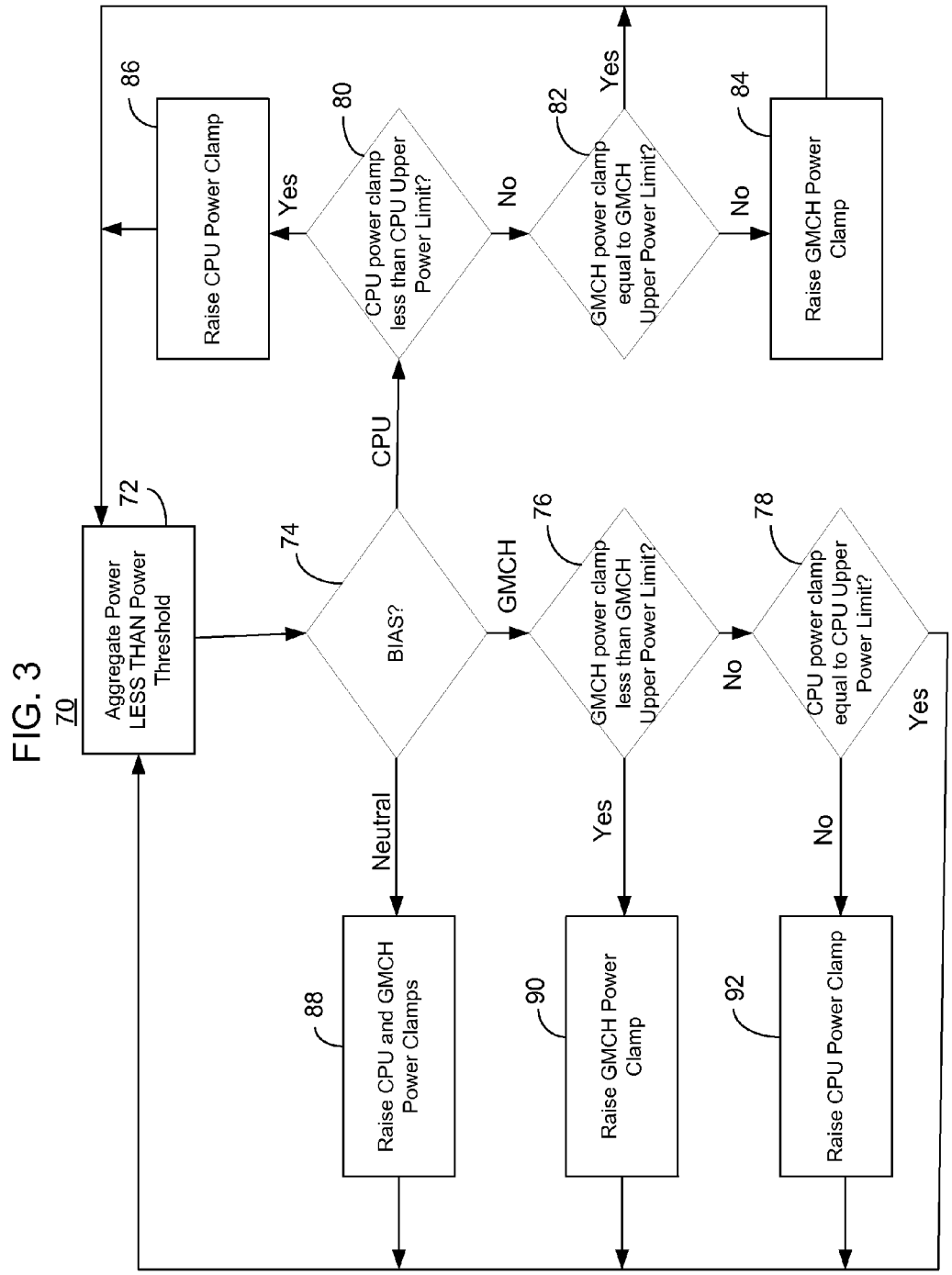
FIG. 3 is a process for managing power of multiple self-regulating power consumption devices in accordance with various embodiments.

FIG. 3 illustrates a process for controlling the individual power consumption and heat dissipations of two power consumption devices, such as a CPU and a GMCH, when the aggregate power of the CPU and GMCH is less than an aggregate power threshold, in accordance with various embodiments of the present invention. More particularly, the process 70 illustrates how power clamps for self-regulating power consumption devices, such as the previously described self-regulating CPU and GMCH, are individually adjusted upwards when the aggregate power for the CPU and the GMCH is less than the aggregate power threshold and the individual temperatures for the CPU and the GMCH are less than their individual temperature limits.

In some embodiments, the process 70 may be executed using the system 60 of FIG. 2 in which case the process 70 may be continuously or periodically executed over and over again when the CPU and the GMCH are in operation. For purposes of the following description, the CPU and GMCH may each operate within a corresponding power range. Such a range may be defined by an upper power limit and a lower power limit. Each of the CPU and the GMCH may have corresponding power clamps to limit the power or heat dissipations by the CPU and the GMCH. In various embodiments, these power clamps may be set anywhere within the upper and lower power limits of the CPU and the GMCH. As described herein, under certain conditions, at least the upper power limits may be raised in order to achieve, for example, optimal performance.

For the embodiments, the process 70 may begin when the aggregate power of the CPU and the GMCH has been determined to be less than the power threshold at 72. A determination may be made as to whether there is a bias towards the CPU or the GMCH or there is no bias (i.e., neutral) at 74. If it is determined that there is a bias towards the CPU, for example by a user electing to bias towards the CPU, then a determination may be made as to whether the power clamp for the CPU is currently less than the upper power limit for the CPU at 80. If true, then the power clamp for the CPU may be raised at 86, and the process 70 starts all over again at block 72. If the power clamp for the CPU is determined to be equal to the upper power limit of the CPU, then a determination may be made at 82 as to whether the power clamp for the GMCH is equal to the upper power limit of the GMCH. If so, then the process 70 may begin again at block 72. In contrast, if the power clamp for the GMCH is determined to be less than the upper power limit of the GMCH then the power clamp for the GMCH may be raised at 84, and the process 70 may begin again at 72.

If a determination was made at 74 that there is a bias towards the GMCH rather than towards the CPU as described above then a determination may be made as to whether the power clamp for the GMCH is less than the upper power limit for the GMCH at 76. If the power clamp for the GMCH is determined to be less than the upper power limit of the GMCH then the GMCH power clamp may be raised at 90. If, however, the power clamp for the GMCH is determined to be equal to the upper power limit of the GMCH then a determination may be made as to whether the power clamp for the CPU is equal to the upper power limit of the CPU at 78. If so, then the process 70 returns to block 72. On the other hand, if the power clamp for the CPU is determined to be less than the upper power limit of the CPU then the power clamp for the CPU may be raised at 92.

Finally, if a determination was made at 74 that there is no bias towards either the CPU or the GMCH, meaning that there is neutral biasing, then the power clamps for both the CPU and the GMCH may be raised equally, proportionally, or in some other manner at 88. This assumes that the power clamps for the CPU and the GMCH are not already equal to the upper power limits of the CPU and GMCH. If one or both of the power clamps for the CPU and the GMCH is or are already equal to the upper power limits of their respective devices than one or both of the power clamps may not be raised at 88 even if the applications being executed by the CPU and the GMCH calls for higher power.

FIG. 4 illustrates a process for controlling the individual power consumptions/heat dissipations of the CPU and the GMCH of FIG. 2 when the aggregate power of the CPU and GMCH is greater than the aggregated power threshold for the CPU and GMCH or if the individual temperatures for the CPU and the GMCH are greater than their individual temperature limits, in accordance with various embodiments of the present invention. More specifically, the process 100 illustrates how the power clamps for the self-regulating CPU and the self-regulating GMCH previously described may be adjusted downwards when the aggregate power for the devices is greater than the aggregated power threshold (i.e., the maximum combined power that is allowed) for the devices or the temperatures of one or both of the CPU and GMCH are greater than their individual temperature limits.

In some embodiments, the process 100 may be executed using the system 60 of FIG. 2 in which case the process 100 may be continuously or periodically executed over and over again when the CPU and the GMCH are in operation. Again, for purposes of the following description, each of the CPU and GMCH may operate within a corresponding power range, which may be defined by an upper power limit and a lower power limit.

For the embodiments, the process 100 may begin when the aggregate power of the CPU and the GMCH is determined to be greater than the power threshold at 102. A determination may be made as to whether there is a bias towards the CPU or the GMCH or there is no bias towards either the CPU or the GMCH (i.e., neutral) at 104. If it is determined that there is a bias towards the GMCH then a determination may be made as to whether the power clamp for the CPU is currently equal to the lower power limit of the CPU at 110. If not, then the power clamp for the CPU may be reduced at 116, and the process 100 may be repeated again starting at block 102. If, on the other hand, the power clamp for the CPU is determined at 110 to be equal to the lower power limit of the CPU then a determination is made at 112 as to whether the power clamp for the GMCH is equal to the lower power limit of the GMCH. If true, then the process 100 may begin again at block 102. On the other hand, if the power clamp for the GMCH is determined to be greater than the lower power limit of the GMCH at 112 then the power clamp for the GMCH may be reduced at 114, and the process 100 may be repeated again starting at 102.

If a determination was made at 104 that there is a bias towards the GMCH instead of towards the CPU, as described above, then another determination may be made as to whether the power clamp for the GMCH is equal to the lower power limit for the GMCH at 106. If the power clamp for the GMCH is determined not to be equal to the lower power limit of the GMCH then the GMCH power clamp may be reduced at 120. If, however, the power clamp for the GMCH is determined to be equal to the lower power limit of the GMCH at 106 then a determination may be made as to whether the power clamp for the CPU is equal to the lower power limit for the CPU at 108. If true, then the process 100 may be repeated starting at block 102. On the other hand, if the power clamp for the CPU is determined to be greater than the lower power limit of the CPU then the power clamp for the CPU may be reduced at 122.

Finally, if a determination was made at 104 that there is no bias towards either the CPU or the GMCH, meaning that there is neutral biasing, then the power clamps for both the CPU and the GMCH may be reduced equally, proportionally, or in some other manner at 118. This assumes that the power clamps for the CPU and the GMCH are currently not equal to the lower power limits of the CPU and GMCH. If one or both of the power clamps for the CPU and the GMCH is or are already equal to the lower power limits of their respective devices then the one or both of the power clamps may not be reduced at 118.

Although the above described processes 70 and 100 are directed to a self-regulating CPU and a self-regulating GMCH, the processes 70 and 100 may be directed to any type of self-regulating power consumption/heat dissipation devices. Further, the processes 70 and 100 may be extrapolated to be used for three or more self-regulating power consumption/heat dissipation devices in various alternative embodiments.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method for power management, comprising:
monitoring power consumption conditions of a plurality of power consumption devices configured to independently self-regulate power consumption, wherein said power consumption devices have corresponding power clamps, the power clamps defining power consumption levels to restrict the power consumption devices from operating at power consumption levels that are greater than the power consumption levels specified by the power clamps;
determining whether an aggregate of the power consumptions of the plurality of power consumption devices exceeds a threshold; and
terminating at least partially the independent self-regulation of power consumption of the plurality of power consumption devices and intervening in power regulation of one or more of the power consumption devices, if the aggregate of the power consumption of the power consumption devices was determined to exceed the threshold;
wherein said intervening includes reducing one or more of the power clamps and if the aggregate of the power consumption of the power consumption devices was determined to exceed the threshold, then said reducing includes determining whether a first power clamp of a first power consumption device is equal to a lower power limit of the first power consumption device, and if so determined, reducing a second power clamp of a second power consumption device if the second power clamp is greater than a lower power limit of the second power consumption device.

2. The method of claim 1, wherein said intervening includes reducing the power consumption of one or more of the power consumption devices.

3. The method of claim 1, wherein if said aggregate power consumption of the power consumption devices was determined to be below the threshold, intervening in power regulation of one or more of the power consumption devices by raising power clamp or clamps of the one or more of the power consumption devices.

4. The method of claim 1, wherein said monitoring includes monitoring temperatures of the plurality of power consumption devices, and said terminating is based on, in addition to the determination of whether the aggregate of the power consumptions exceeds the threshold, the monitoring of the temperatures.

5. The method of claim 1, wherein said plurality of power consumption devices are disposed on a package substrate, and said monitoring includes monitoring electrical currents through the power consumption devices to determine power consumptions of the power consumption devices, to monitor the power consumption conditions of the power consumption devices.

6. The method of claim 5, wherein the power consumption devices include a central processing unit (CPU) and a Graphics and Memory Controller Hub (GMCH).

7. The method of claim 5, further comprising prior to said intervening the power consumption devices operating at the power consumption levels specified by the power clamps based, at least in part, on applications to be executed by the power consumption devices.

8. An apparatus capable of power management, comprising:
a first and a second power consumption device having a first and a second power clamp to clamp the first and second power consumption devices at a first and a second power consumption level to limit the first and the second power consumption device to a first and a second power consumption limit, respectively; and
a power consumption management block physically and thermally coupled to the first and second power consumption devices to conditionally modify at least one of said clamping of power consumption of said first and second power consumption devices in view of the combined power consumption of the first and second power consumption devices;
wherein said power consumption management block is adapted to compare a combined power consumption of the first and second power consumption devices to a threshold and if the combined power consumption is determined to be greater than the threshold to reduce at least one of the first or the second power clamp; and
wherein said power consumption management block is further adapted to, if the combined power consumption is determined to be greater than the threshold, determine whether the first power clamp is equal to a lower power limit of the first power consumption device, and if so determined, reduce the second power clamp of the second power consumption device if the second power clamp is greater than a lower power limit of the second power consumption device.

9. The apparatus of claim 8, wherein the power consumption management block is adapted to determine a first power consumption of the first power consumption device and a second power consumption of the second power consumption device to calculate the combined power consumption of the first and second power consumption devices to said conditionally modify at least one of said clamping of power consumption of said first and second power consumption devices.

10. The apparatus of claim 9, wherein said power consumption management block is further adapted to determine the first and second power consumption by measuring electrical currents flowing through the first and second power consumption devices.

11. The apparatus of claim 9, wherein said power consumption management block is further adapted to determine a first and a second temperature of the first and the second power consumption device to said conditionally modify the at least one of said clamping of power consumption of said first and second power consumption devices.

12. The apparatus of claim 8, wherein said first power consumption device is a processor and said second power consumption device is a controller.

13. The apparatus of claim 8, wherein said first and second power consumption devices are configured to independently self-regulate thermal production by providing the first and second power clamps prior to said power consumption management block conditionally modifying at least one of the power clamps.

14. The apparatus of claim 13, wherein said first and second power consumption devices are further configured to operate at or below first and second power clamps based on applications being executed.

15. A system capable of thermal management, comprising:
- a first and a second processor co-disposed in one or more integrated circuit packages, each processor configured to self-regulate their power consumption; and
- a thermal controller for thermal management coupled to the processors, the thermal controller configured to determine that an aggregate of the power consumptions of the first and the second processors exceeds a threshold, determine that the first processor has a power clamp that is equal to a low power limit of the first processor, reduce a power clamp of the second processor based on the determination that the power clamp of the first processor is equal to the low power limit of the first processor.

16. The system of claim 15, further comprising a platform thermal control coupled to the thermal controller to provide to the thermal controller a performance preference to the first processor, the second processor, or neither.

* * * * *